May 13, 1952 V. ASARO 2,596,196
SPRING STRUCTURE
Filed July 23, 1945 2 SHEETS—SHEET 1

INVENTOR.
Vito Asaro
BY
ATTORNEYS.

May 13, 1952 V. ASARO 2,596,196
SPRING STRUCTURE
Filed July 23, 1945 2 SHEETS—SHEET 2

INVENTOR.
Vito Asaro
BY Earl D. Chappell
ATTORNEYS.

Patented May 13, 1952

2,596,196

UNITED STATES PATENT OFFICE 2,596,196

SPRING STRUCTURE

Vito Asaro, Detroit, Mich., assignor to L. A. Young Spring and Wire Corporation, Detroit, Mich., a corporation of Michigan Application July 23, 1945, Serial No. 606,549

6 Claims. (Cl. 155—179)

The main objects of this invention are:

First, to provide a spring structure in which the frame though light in weight is very rigid in a horizontal direction or transversely of the cushion structure and at the same time may be formed of light stock and is braced so as to prevent sidewise swaying.

Second, to provide a spring structure having brace members in which the brace members are securely attached to the rim and so that there is no undue wear on the upholstery and they are not likely to become detached or rupture through the upholstery.

Third, to provide a structure having complementary rim sections in which the rim sections are very securely connected without objectionable projections likely to wear the upholstery.

Fourth, to provide a structure having these advantages which is economical to make and one in which the parts are easily assembled.

Objects relating to details and economies of the invention will appear from the description to follow. The invention is defined and pointed out in the claims.

Preferred embodiments of the invention are illustrated in the accompanying drawings, in which.

Figure 1:
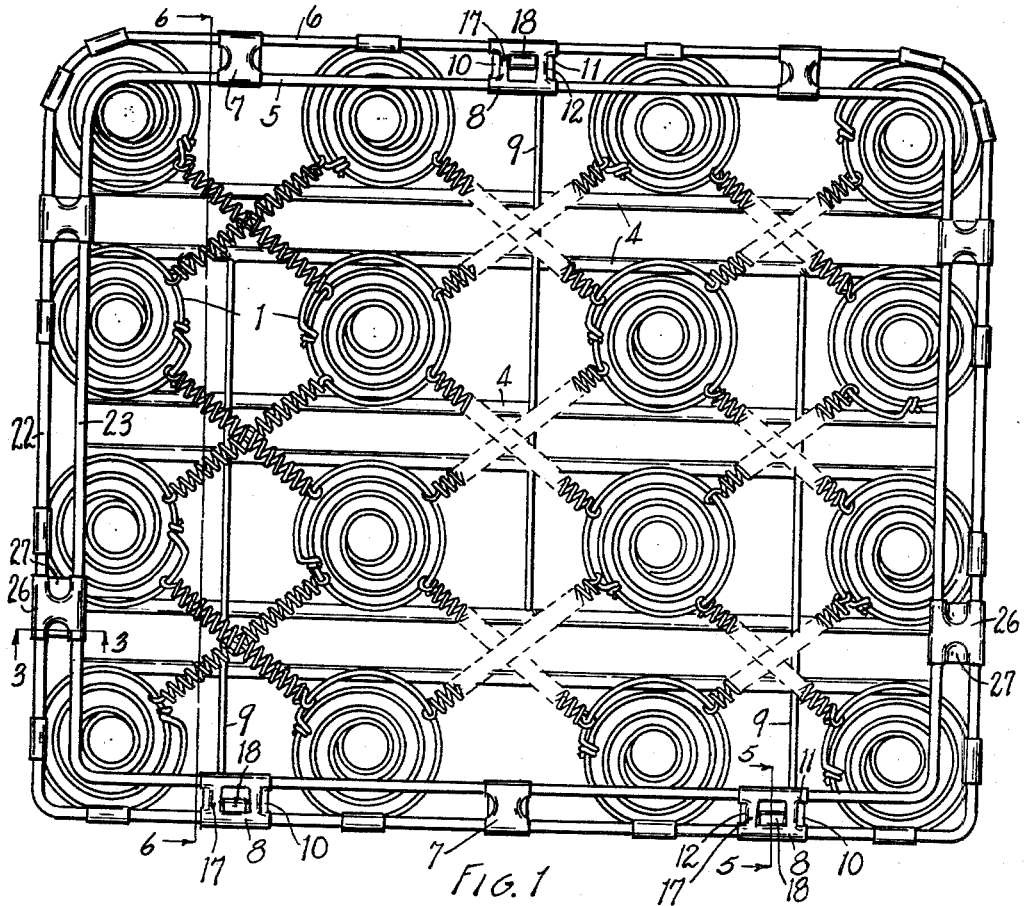
Fig. 1 is a plan view of a spring seat structure embodying my invention, parts being shown conventionally.
Figure 2:
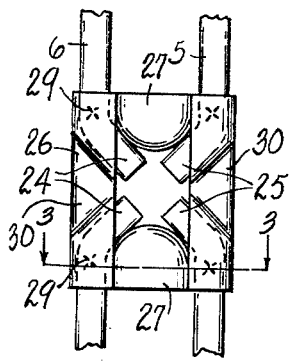
Fig. 2 is an enlarged fragmentary view of one of the couplings for the complementary rim units.
Figure 3:
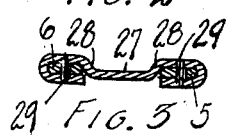
Fig. 3 is a cross section on line 3—3 of Figs. 1 and 2.

In the accompanying drawings the body springs 1 are of the helical type, the bottom border frame 2 illustrated being formed of rod or wire. The outer body springs are connected to this border frame by clips 3 and the bottom coils of the springs are further connected by means of the U-shaped tie members 4 which are clamped upon the bottom coils of aligned springs. It will be understood that in practice the bottom frame is greatly varied according to the particular requirements.

The top border frame comprises inner and outer frame members 5 and 6 preferably formed of flat wire stock disposed flatwise or with their flat sides horizontally. It should be borne in mind, however, that my improvements are adapted to back cushion springs as well as seat cushion springs and the term "horizontally" as used herein is a relative term.

The inner and outer frame members are secured together by clips 7 and 8 spaced suitably. This arrangement, generally considered, is that shown in my Patent 2,336,975, issued December 14, 1943, my present invention being in some respects an adaptation and an improvement upon the structure of that patent. The clips 7 are the same as those illustrated in certain figures of my patent.

The clip members 8 serve the additional function of securing the braces 9 to the top. The clip members 8 are provided with oppositely disposed offsets 10 in its side edges forming outwardly facing shoulders 11 which engage the inner edges of the frame members 5 and 6. These offsets provide inwardly facing shoulders 12 between which the laterally disposed arm 13 of the brace 9 is positioned when the brace is assembled. The arm 13 preferably terminates in an inturned finger or lug 14, see Fig. 4.

Figure 4:
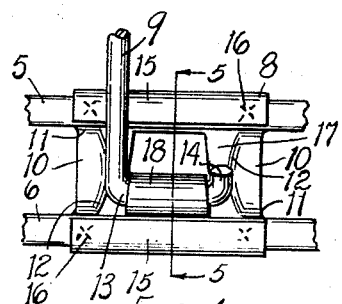
Fig. 4 is an enlarged fragmentary inverted view illustrating details of the frame structure and of the attachment of the brace thereto.
Figure 5:
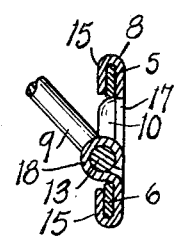
Fig. 5 is a fragmentary view in section on a line corresponding to line 5—5 of Figs. 1 and 4.

The ends 15 of the clips are folded or clamped around the frame members and preferably spot-welded as conventionally illustrated at 16. The web or intermediate portion 17 of the clips has a tongue 18 struck out therefrom, this tongue being folded around the arm of the brace, as best shown in Figs. 4 and 5.

The base of the tongue lies against the inner edge of the outer frame member 6 so that the tongue is supported thereby and thrust of the brace is largely sustained by the outer frame member. It will also be noted that the thrust of the brace on the border frame is upwardly and that the ends of the arm or the portions where the arm joins the brace and the lug 14 underlie the web of the clip so that thrust is further sustained by parts other than the tongue.

The inner end of the brace in the embodiment shown in Figs. 1 to 7 is provided with an arm corresponding to the arm 13 which is disposed within the channel of the tie member and secured therein by clamping the edges of the tie member thereon as at 19.

Figure 8:
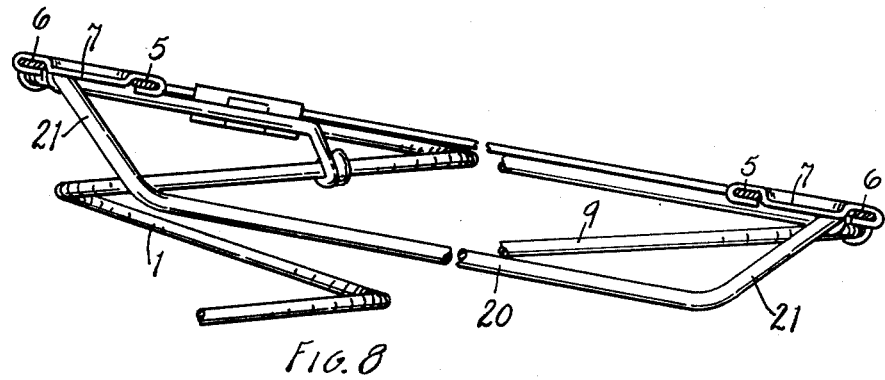
Fig. 8 is an enlarged fragmentary section of a modified form or embodiment of my invention in which the brace extends between the opposed frame side members.

In Fig. 8, the structure has a cross brace 20 having upturned ends 21 secured to opposed side members of the frame, the same as the brace described. Particularly in larger cushions, this is a desirable feature. It is obvious that is may be used in combination with the braces 9 where additional bracing or tying is desired.

In the embodiment illustrated, the frame comprises complementary sections designated generally by the numerals 22 and 23, the ends of these sections being disposed in alignment. The ends of the frame members are inwardly bent to provide pairs of converging arms 24 and 25. The coupling members or clips designated generally by the numeral 26 are formed of sheet metal and have offset edges 27 in the intermediate side portions thereof providing shoulders 28 engaging the edges of the frame members with the arms 25 of the frame members engaging the inner sides of these offsets. The edges 27 of the coupling members or clips are folded around the frame members and welded thereto at 29. These inturned edges 27 are indented at 30 between the arms of the sections to further clamp the frame members. This provides a very rigid and secure connection for the frame sections and one which is light in weight and does not result in objectionable projections.

It will be noted that the tongue 18 is tapered. This facilitates its wrapping around the arm as the edges of the tongue do not engage the edges of the opening and there is no binding even if the tongue is slightly distorted in folding around the brace arm.

Figure 9:
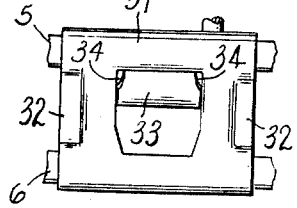
Fig. 9 is a fragmentary top view similar to that of Fig. 4 of a slightly modified form of clip.
Figure 6:
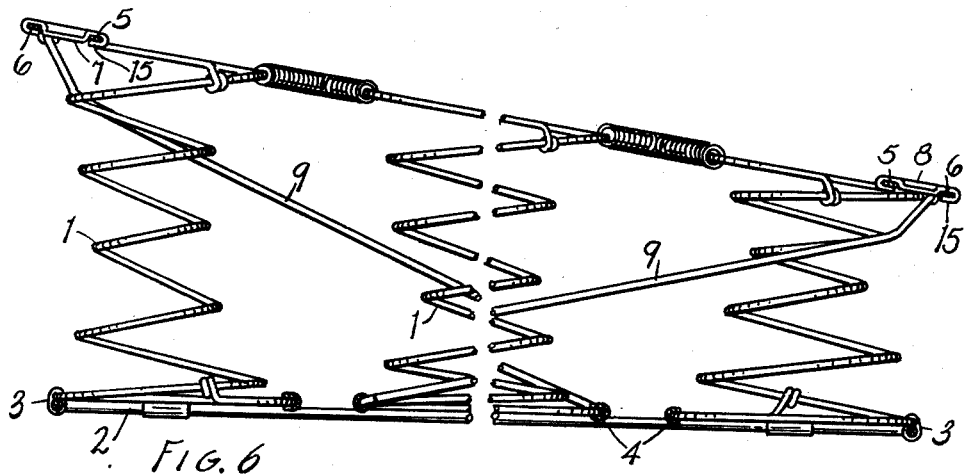
Fig. 6 is a view in section on line 6—6 of Fig. 1.
Figure 7:
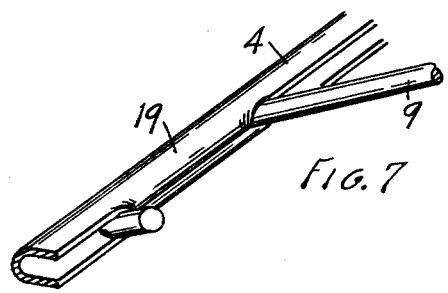
Fig. 7 is an enlarged perspective view illustrating details of securing one of the brace members to one of the bottom tie members.

In the embodiment shown in Fig. 9, the clip 31 has portions 32 struck down from the edges thereof providing shoulders corresponding to the shoulders 12 described, the tongue 33 having only its tip portion tapered at 34. This shows another adaptation which is highly practical.

I have illustrated and described my invention in highly practical embodiments thereof. I have not attempted to illustrate or describe other adaptations which I contemplate as it is believed that this disclosure will enable those skilled in the art to embody or adapt my invention as may be desired.

Having thus described my invention, what I claim as new and desire to secure by Letters Patent, is:

1. In a spring structure, the combination with coiled body springs, of a tie member of U-section clamped upon corresponding coils of a plurality of said springs, a top border frame comprising flat spaced inner and outer frame members, a clip of sheet metal connecting said spaced frame members and having oppositely disposed offsets in the side edges thereof, the ends of which constitute spaced pairs of shoulders in engagement with the adjacent edges of the frame members, the ends of said clip being clamped upon said frame members and rigidly engaging the latter to prevent relative rotation of the clip and frame members, a portion of the web of the clip between said offsets and between said ends of the clip being struck therefrom to provide a clamping tongue, and a brace having laterally disposed arms terminating in inturned lugs, the arm at one end of said brace being clamped in the channel of said tie member, the arm at the other end of the brace being disposed below said clip between the said offsets thereof, said tongue being rolled around said arm, the length of the arm exceeding the width of the opening resulting from the striking of the tongue from the clip whereby the arm overlaps the edges of the opening.

2. In a spring structure, the combination with coiled body springs, of a top border frame connected to said springs and comprising inner and outer frame members of flat section disposed in spaced relation, a clip of sheet metal connecting said spaced frame members and having oppositely disposed offsets in the side edges thereof, the ends of which constitute spaced pairs of shoulders in engagement with the adjacent edges of the frame members, the ends of said clip being clamped upon said frame members and rigidly engaging the latter to prevent relative rotation of the clip and frame members, a portion of the web of the clip between said offsets and between said ends of the clip being struck therefrom to provide a clamping tongue, and a brace having a laterally disposed arm disposed below said clip between the said offsets thereof, said tongue being rolled around said arm.

3. A border frame for spring structures comprising oppositely disposed side members comprising inner and outer frame members disposed in spaced relation, clips connecting said frame members and formed of sheet metal pieces of substantial width having the ends thereof clamped upon the frame members and having intermediate portions thereof offset to provide shoulders which are in engagement with the frame members, there being oppositely disposed clips on the side members of said frame, said clips having tongues struck from the intermediate portions thereof between said frame members, and a brace extending between said side members and having laterally disposed arms secured to said clips by said tongues.

4. In a spring structure, the combination with body springs, of a border frame comprising oppositely disposed side members to which the top coils of the outer body spring are connected, said border frame comprising inner and outer frame members disposed in spaced relation, clips connecting said frame members and formed of sheet metal having the ends thereof clamped around the frame members and having intermediate portions thereof offset to provide shoulders which are in engagement with the confronting edges of the frame members, there being oppositely disposed clips on opposite side members of said frame, said clips having tongues struck from the intermediate portions thereof between said frame members, and a brace extending between said opposite side members and having laterally disposed arms secured to said clips by said tongues.

5. In a spring structure, the combination with body springs, of a border frame connected to said springs and comprising inner and outer frame members disposed in spaced parallel relation, a clip of sheet metal connecting said frame members and having offsets intermediate said frame members providing outwardly facing shoulders engaging said frame members, the ends of said clip being clamped around the frame members to coact with said shoulders in fixedly connecting said frame members, the web portion of said clip intermediate said frame members having a bendable tongue struck out therefrom, said tongue being connected to said clip at its outer end, and a brace disposed below said clip and having a laterally disposed portion secured thereto by said tongue, the end of said tongue connected to said clip being in supported engagement with the outer frame member.

6. A spring structure comprising inner and outer frame members disposed in spaced parallel relation, a bendable sheet metal clip connecting said spaced frame members and having intermediate portions thereof offset providing shoulders which engage the adjacent edges of the frame members, the ends of said clip being clamped upon said frame members to clamp the same against said shoulders, the intermediate portion of said clip being slit between said frame members to provide a bendable tongue, and a brace having a laterally disposed portion secured to said clip by said bendable tongue.

VITO ASARO.

REFERENCES CITED

The following references are of record in the file of this patent:

UNITED STATES PATENTS

| Number | Name | Date |
|---|---|---|
| 693,866 | Hulse et al. | Feb. 25, 1902 |
| 789,815 | Neider | May 16, 1905 |
| 789,848 | Freschl | May 16, 1905 |
| 1,419,492 | Goda | June 13, 1922 |
| 1,496,233 | Knepper | June 3, 1924 |
| 1,497,888 | Brandt | June 17, 1924 |
| 1,506,186 | Owen et al. | Aug. 26, 1924 |
| 1,554,320 | Allen | Sept. 22, 1925 |
| 1,605,415 | Willoughby | Nov. 2, 1926 |
| 1,826,012 | McElroy | Oct. 6, 1931 |
| 1,998,898 | Konkel | Apr. 23, 1935 |
| 2,002,157 | Reed | May 21, 1935 |
| 2,122,979 | Gleason | July 5, 1938 |
| 2,313,130 | Dorton | Mar. 9, 1943 |
| 2,336,975 | Asaro | Dec. 14, 1943 |